(12) United States Patent
Wright (10) Patent No.: US 7,111,998 B2
(45) Date of Patent: Sep. 26, 2006

(54) ADJUSTABLE CAMERA WITH BELT TENSIONING APPARATUS

(75) Inventor: Richard R Wright, Reinholds, PA (US)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 10/849,399

(22) Filed: May 19, 2004

(65) Prior Publication Data

US 2005/0259984 A1 Nov. 24, 2005

(51) Int. Cl.
*G03B 17/00* (2006.01)
*F16H 7/14* (2006.01)
(52) U.S. Cl. .................. 396/427; 474/112; 474/114
(58) Field of Classification Search ............... 396/419, 396/427; 474/112, 114, 133
See application file for complete search history.

(56) References Cited

U.S. PATENT DOCUMENTS

| 1,657,024 A | * | 1/1928 | Morse ..................... 474/112 |
| 4,934,891 A | | 6/1990 | Hawkswell ............ 414/223.01 |
| 5,627,616 A | | 5/1997 | Sergeant et al. ............ 396/427 |
| 6,343,880 B1 | | 2/2002 | Kamoda et al. ............ 396/411 |
| 2003/0104887 A1 | * | 6/2003 | Arbuckle et al. ........... 474/112 |
| 2004/0053719 A1 | * | 3/2004 | Gibson ...................... 474/112 |

* cited by examiner

Primary Examiner—W. B. Perkey
Assistant Examiner—Rishi Suthar
(74) Attorney, Agent, or Firm—Baker & Daniels LLP (57) ABSTRACT

A camera assembly including first and second rotating members and a motor assembly defining a first axis and operably coupled to first rotating member to drivingly rotate first rotating member. A flexible member operably couples first and second rotating members such that rotation of first rotating member causes rotation of second rotating member. A camera is operably coupled to second rotating member such that rotation of second rotating member repositions camera. The motor assembly includes a flange having an outer circumference defining a plurality of teeth and bearing against a support surface. The outer circumference defines a radially variable distance from first axis such that rotation of outer circumference against support surface displaces first axis relative to second rotational member and thereby adjusts a tensional force in flexible member. At least one pawl mechanism is fixed relative to support surface and is engageable with outer circumference.

17 Claims, 6 Drawing Sheets

ADJUSTABLE CAMERA WITH BELT TENSIONING APPARATUS

BACKGROUND OF THE INVENTION

1. Field of the Invention

The present invention relates to adjustable cameras and, more particularly, to pan, tilt, zoom cameras wherein a belt driving the rotational movement of the camera about an axis can be easily and selectively tensioned.

2. Description of the Related Art

Pan-tilt-zoom (PTZ) surveillance camera assemblies commonly use stepper motors to affect the pan and tilt motion of the camera. Such assemblies often include a timing belt operably coupling a small sprocket attached to the motor shaft to a larger sprocket attached to the camera. In operation, the rotation of the motor shaft drives the rotation of the small sprocket. The rotation of the small sprocket, via the belt, affects the rotation of the larger sprocket and, thereby, the movement of the camera. However, tolerances of the camera assembly components may vary from one assembly to the next. Such variances can produce camera assemblies having a belt that is either too loose or too tight. Belts that are too loose may produce hysteresis or slippage that adversely affects preposition accuracy of the camera assembly. Furthermore, a loose belt may shift entirely out of engagement with one or both of the sprockets, thus causing a failure of the assembly. If the belt is too tight, it can be difficult or impossible to assemble and attempts to assemble the belt drive may result in damage to the belt or other components. If assembled, the overly tight belt may induce premature wear of the belt or other components due to excessive forces generated by the overtightened belt.

Figure 1:
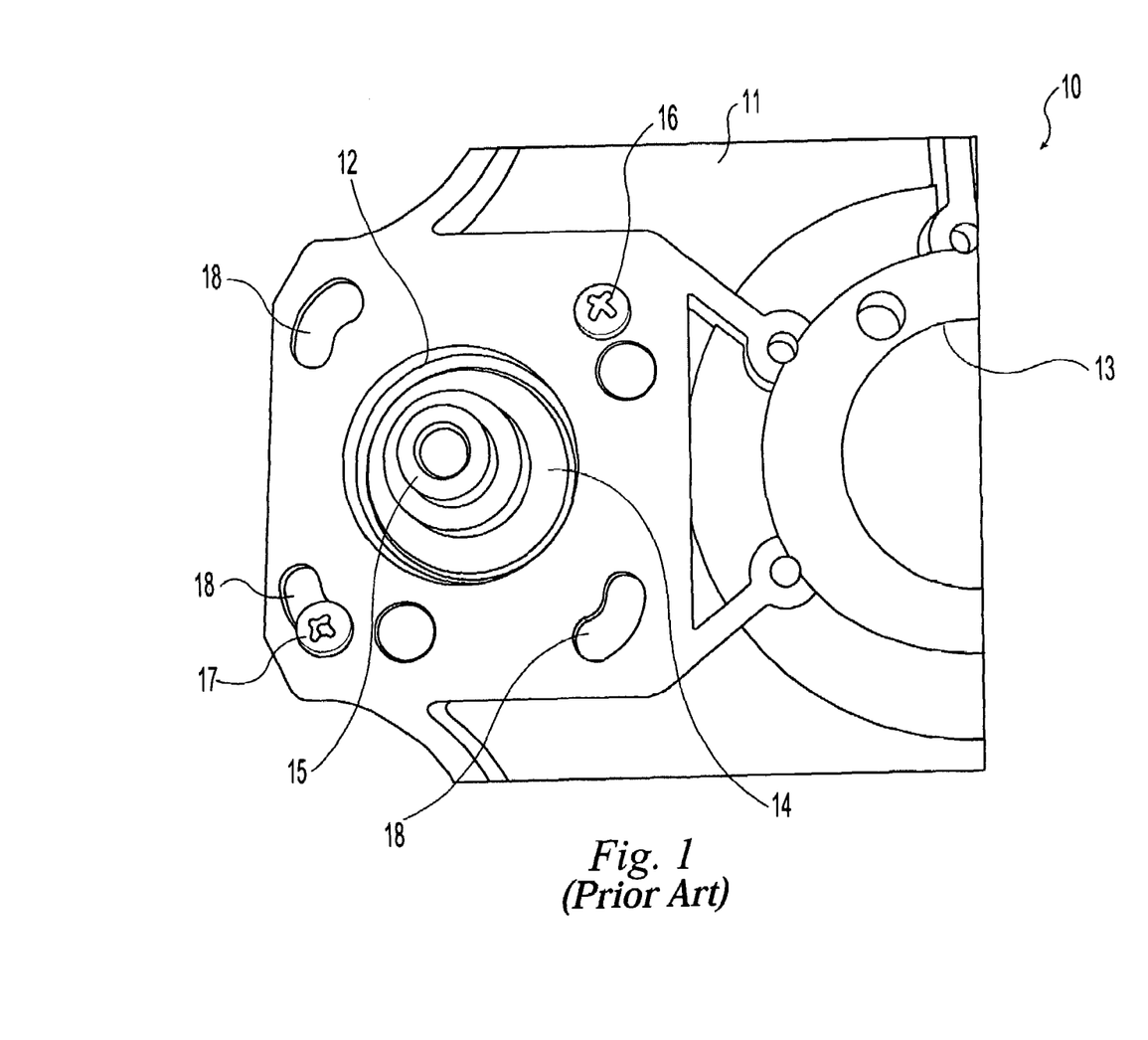
FIG. 1 is a top view of a prior art camera tilt assembly.

Some known camera assemblies include a means for selectively adjusting the tension of the belt during assembly to thereby provide the proper belt tension. For instance, dome cameras, available from Bosch Security Systems, Inc. having a place of business at Fairport, N.Y., U.S., are known to use the tilt assembly 10 shown in FIG. 1. The assembly 10 includes a plate 11 having a first opening 12, through which a first rotating member 15 is received, and a second larger opening 13 for receiving a second rotating member (not shown). A motor assembly 14 is engaged to the first rotating member 15 and is mounted to the plate 11 using screws 16, 17. A belt (not shown) operably couples the first rotating member 15 to the second rotating member. To adjust the tension of the belt, the motor assembly 14 is pivoted about pivot screw 16, thus causing the first rotating member 15 to move within first opening 12 and toward or away from second opening 13. Securing screws 17 slide within adjustment slots 18 during pivoting of the motor assembly and are subsequently tightened to secure the motor assembly in position. Although the Bosch dome camera provides an effective means for selectively adjusting the tension of the belt, the use of pivot screw 16 and securing screws 17 presents additional loose hardware that must be assembled.

Figure 2:
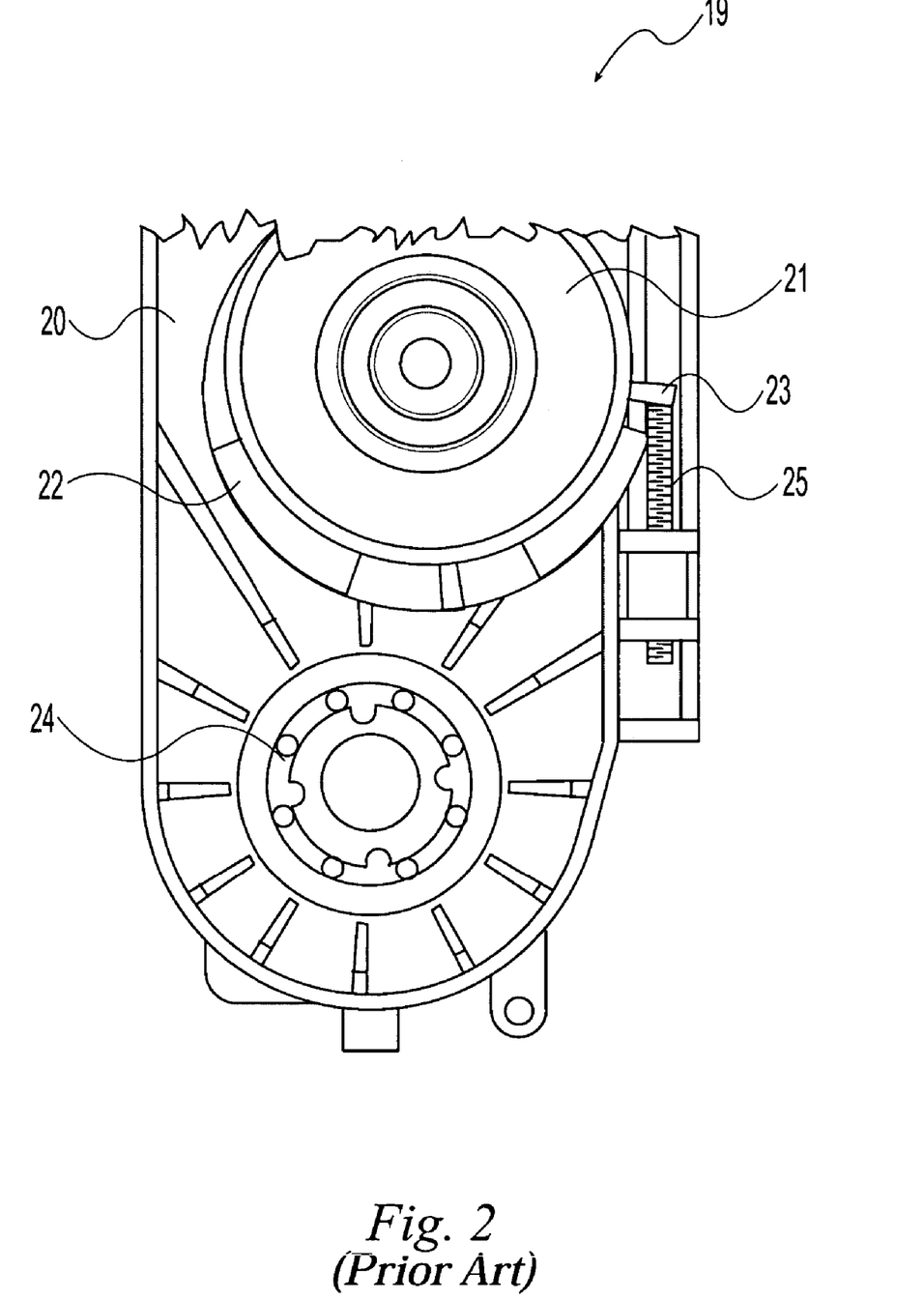
FIG. 2 is a bottom view of another prior art camera tilt assembly.

Pelco dome cameras, available from Pelco, Orangeburg, N.Y., U.S., are known to use the tilt assembly 19 shown in FIG. 2. Tilt assembly 19 includes a plate 20, a motor assembly 21 rotatably mounted in a pocket defined at one end of the plate 20, and a tilt bearing 24 rotatably mounted at the opposite end of the plate 20. A belt (not shown) is positioned on the underside of the plate 20 and connects the rotating members (not shown) of motor assembly 21 and tilt bearing 24. Motor assembly 21 includes an eccentric cam portion 22 and a tab 23. A captive locking screw 25 is provided that engages tab 23. As captive locking screw 25 is adjusted, it moves tab 23 causing motor assembly to rotate within the pocket of plate 20. As the motor assembly 21 rotates in the pocket, eccentric cam portion 22 engages the wall of the pocket causing the motor 21 to move toward or away from the tilt bearing 24, thereby tightening the belt.

Although the known systems provide for the selective tensioning of a belt drive system for a PTZ camera, an improved assembly is desirable.

SUMMARY OF THE INVENTION

The present invention provides a camera assembly having a belt drive capable of being easily and selectively tensioned.

The camera assembly, in one form, includes a first rotating member, a second rotating member, and a motor assembly operably coupled to the first rotating member and defining a first axis. The motor assembly drivingly rotates the first rotating member. A flexible member operably couples the first and second rotating members such that the rotation of the first rotating member causes rotation of the second rotating member through the flexible member. A camera is operably coupled to the second rotating member such that rotation of the second rotating member repositions the camera. The motor assembly includes a flange having an outer circumference defining a plurality of teeth. The outer circumference bears against a support surface. The outer circumference defines a radially variable distance from the first axis defined by the first rotating member such that the rotation of the outer circumference against the support surface displaces the first axis relative to the second rotational member and thereby adjusts a tensional force in the flexible member. At least one pawl mechanism is fixed relative to the support surface and is engageable with the outer circumference such that the engagement of the pawl mechanism with the outer circumference prevents relative rotational motion between the outer circumference and the support surface in a first rotational direction.

The present invention also provides a method of tensioning a flexible member for repositioning a camera. In one form, the method includes providing a camera, providing a motor, and operably coupling the motor and the camera with a belt drive assembly. The belt drive assembly includes a flexible member operably coupling a first rotatable member and a second rotatable member. The method also includes tensioning the flexible member by adjusting the position of the first rotatable member relative to the second rotatable member and securing the first rotatable member in a desired position by engaging a toothed surface with a pawl mechanism. One of the toothed surfaces and the pawl mechanism is fixed relative to an axis of rotation of the first rotatable member.

An advantage of the present invention is that it provides a means for easily and selectively adjusting the tension of the flexible member.

Another advantage of the present invention is that the pawl mechanism may be integrally formed with a base plate in a molding operation whereby the number of parts and assembly time required to provide the tensioning mechanism is minimized.

Another advantage is that the toothed surface, in cooperation with the pawl, provides numerous rotational positions for fine adjustment of the tension.

Other advantages of the present invention will become apparent by referencing the detailed description.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 3:
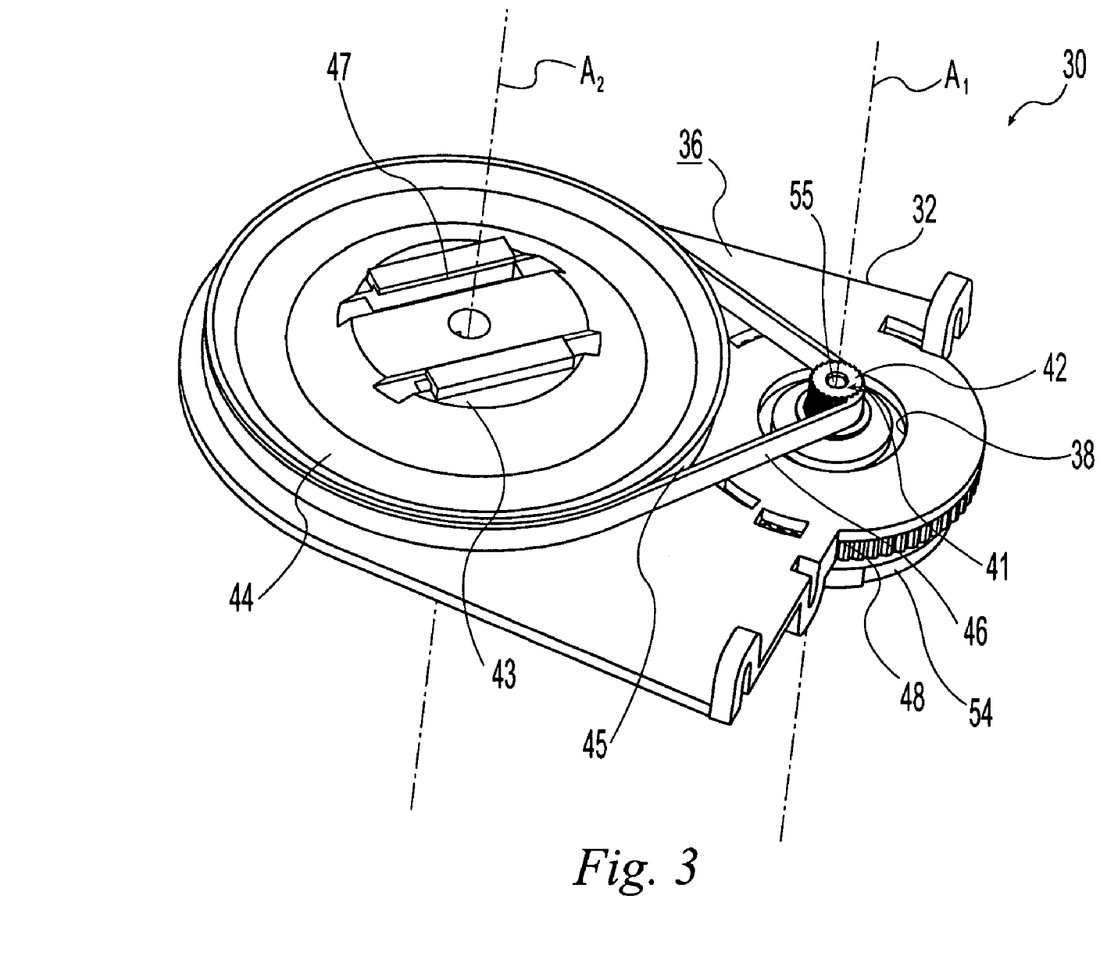
FIG. 3 is a top perspective view of camera tilt assembly according to one embodiment of the present invention.
Figure 4:
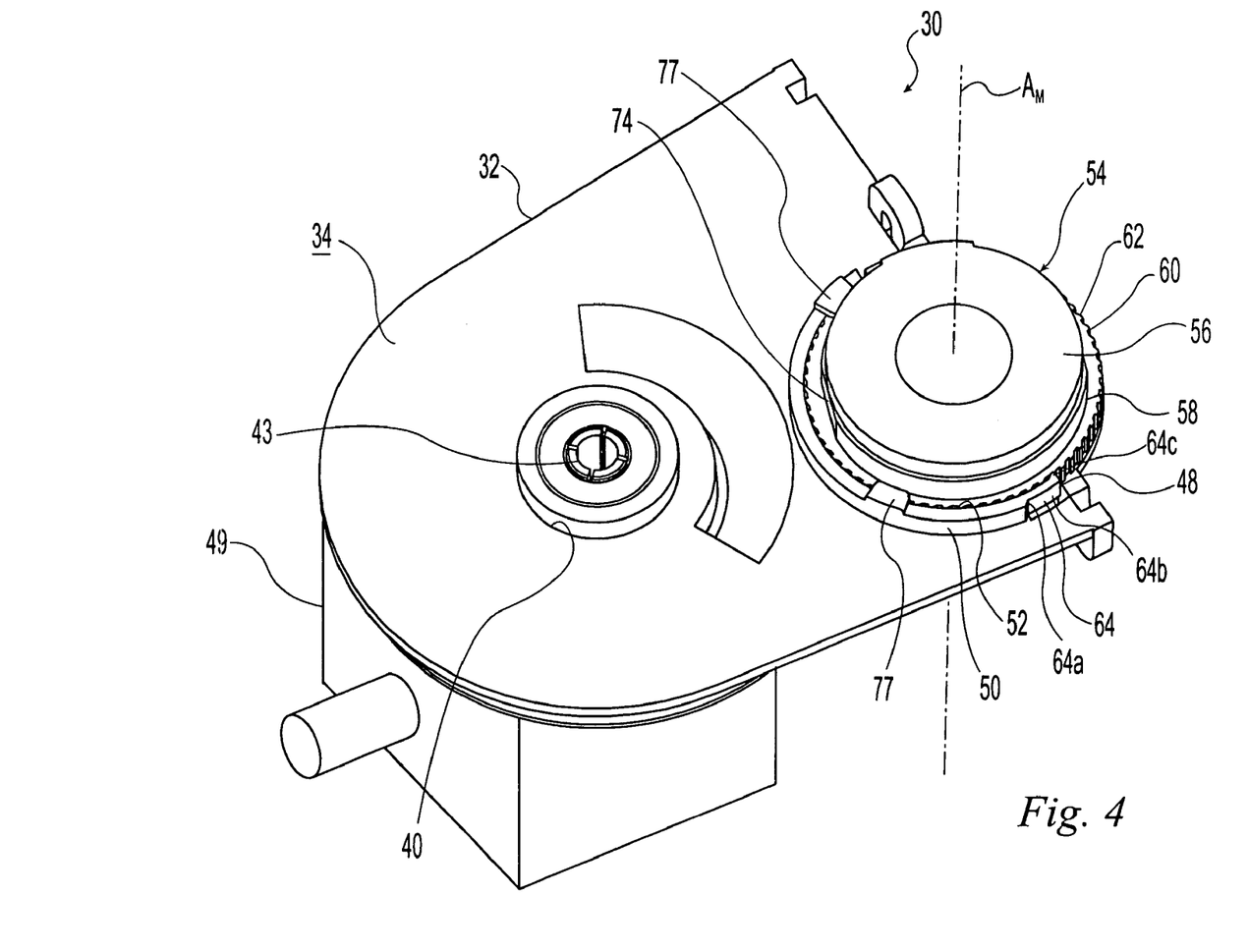
FIG. 4 is a bottom perspective view of the camera tilt assembly of FIG. 3.

Referring first to FIGS. 3 and 4, camera tilt assembly 30 includes a mounting plate 32 defining a first side 34 and an opposite second side 36. Mounting plate 32 defines first and second substantially circular openings 38, 40 extending through plate 32 from first side 34 to second side 36. Referring particularly to FIG. 3, a first rotating member 41 extends through first opening 38 and is rotatable about a first axis $A_1$. First rotating member 41 includes a shaft 55 and a gear portion 42. Rotating member 41 extends through first opening 38 and projects outwardly relative to second side 36 of mounting plate 32.

Referring back to FIGS. 3 and 4, tilt bearing 43 is rotatably secured in second opening 40 and a second rotating member 44 is coupled to tilt bearing 43, such that gear portion 45 of second rotating member 44 is positioned on second side 36 of mounting plate 32. Second rotating member 44 includes camera bracket 47 to which a camera 49 (schematically depicted in FIG. 4) may be mounted. Referring specifically to FIG. 3, a flexible member 46, such as a belt, operably couples gear portion 42 of first rotating member 41 to gear portion 45 of second rotating member 44, such that the rotation of first rotating member 41 affects the rotation of second rotating member 44. The gear portions 42, 45 of rotating members 41, 44 may have discrete teeth which engage corresponding teeth on flexible member 46 whereby the flexible member 46, e.g., a belt, may positively engage the first and second rotating members 41, 44 in a manner which minimizes potential slipping between flexible member 46 and members 41, 44. Such geared belts are well known to those having ordinary skill in the art.

Referring now to FIG. 4, first side 34 of mounting plate 32 includes a substantially circular recess 48 defined by a sidewall 50 which includes a support surface 52. As illustrated in FIGS. 3 and 4, a motor assembly 54 is mounted on first side 34 of mounting plate 32. Motor assembly defines an axis $A_m$ about which the motor shaft rotates. In the illustrated embodiment, first rotating member 41 is operably engaged to the motor shaft 55 of motor assembly 54, such that motor axis $A_m$ is concentric with first axis $A_1$. Motor assembly 54 includes motor housing 56, which defines an eccentric flange 58. Flange 58 is disposed within recess 48, and retaining tabs 77 are provided to retain flange 58 in recess 48 and prevent flange 58 from moving in a direction parallel to motor axis $A_m$. Flange 58 defines an outer circumference 60 which bears against support surface 52 of sidewall 50. Although the first axis $A_1$ and the motor axis $A_m$ are colinear in the disclosed embodiment, alternative configurations, e.g., where the axes are parallel and spaced apart, may also be employed with the present invention.

Figure 5:
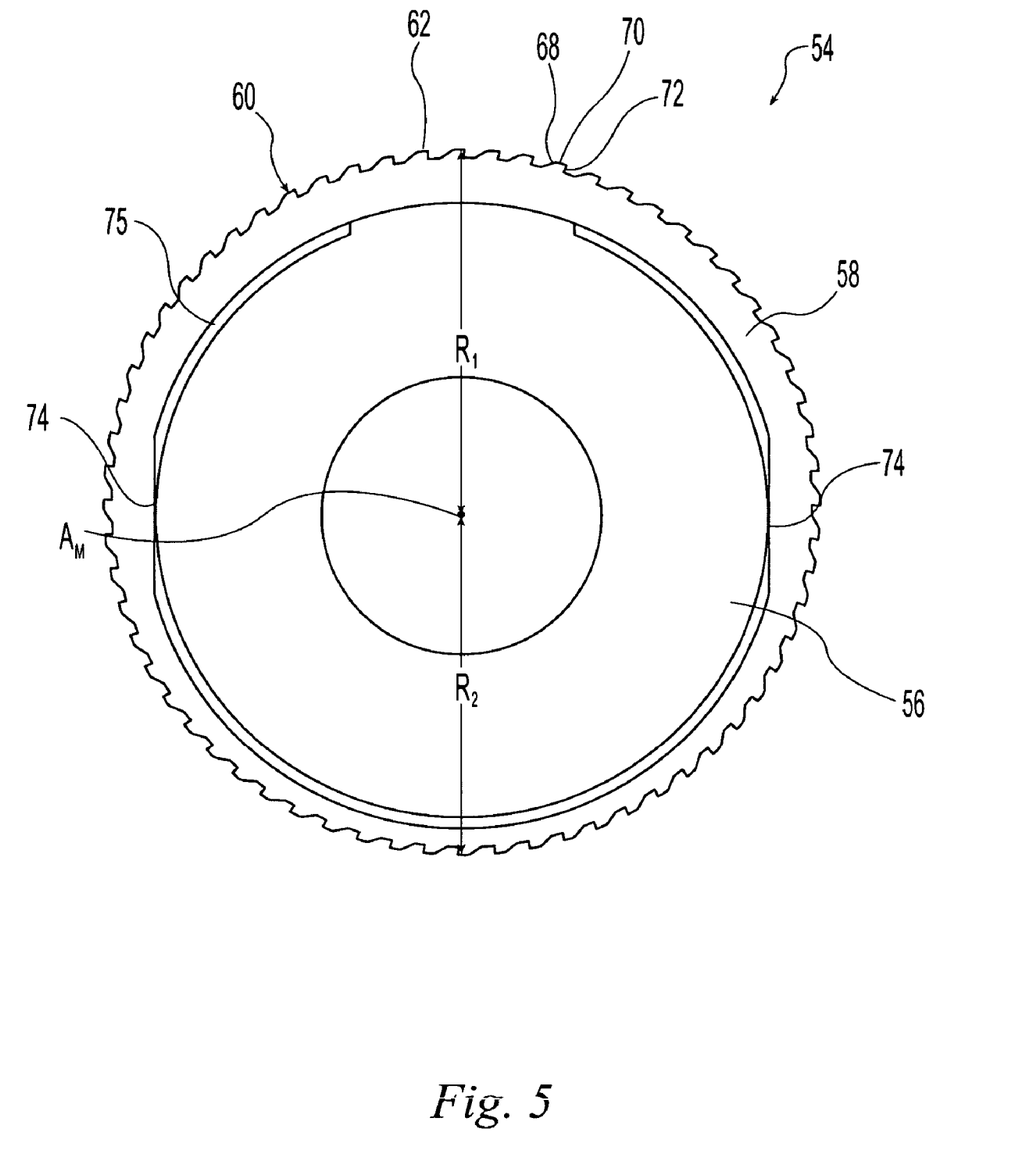
FIG. 5 is a bottom view of the motor assembly of a tilt assembly according to another embodiment of the present invention.

Referring now to FIG. 5, outer circumference 60 of eccentric flange 58 defines a radially variable distance from first axis $A_1$ which, in the illustrated embodiment is colinear with motor axis $A_m$. For example, as illustrated in FIG. 5, the radial distance $R_1$ is greater than the radial distance $R_2$. The radial distance of outer circumference 60 decreases moving clockwise from distance $R_1$ to distance $R_2$ and increases moving clockwise from distance $R_2$ to distance $R_1$. Referring still to FIG. 6, outer circumference 60 defines a plurality of teeth 62 which are formed by a repeating set of surfaces. Each set of surfaces includes, in circumferential order, camming surface 68, bearing surface 70 and latching surface 72. Camming surface 68 extends both circumferentially about and radially outward from first axis $A_1$ (and motor axis $A_m$) to provide a surface tat slopes upward toward bearing surface 70. Bearing surface 70 of outer circumference 60 extends circumferentially about first axis $A_1$ (and motor axis $A_m$) to provide a surface that is substantially complementary to sidewall 50 and can bear flushly against support surface 52. Unlike relatively sharp teeth that would bear against sidewall 50 in a series of line contacts, the extending circumferential length of individual bearing surfaces 70 distributes the force exerted by outer circumference 60 over a larger area of sidewall 50. As a result, the localized stress on sidewall 50 is reduced and teeth 62 are less likely to cut into sidewall 50. If the teeth were to cut into sidewall 50 due to the tension of belt 46, the first axis A1 would shift towards second axis $A_2$ resulting in the lessening of the tension in belt 46. Latching surface 72 extends radially from first axis $A_1$ (and motor axis $A_m$). The circumferential extending length of bearing surfaces 70, however, may increase the distance between adjacent latching surfaces 72 which can result in a greater increment between latched positions. As described in greater detail below, the illustrated embodiment includes two pawl mechanisms for engagement wit surfaces 72 which are positioned to reduce the incremental distance between sequential latching positions.

Figure 6A:
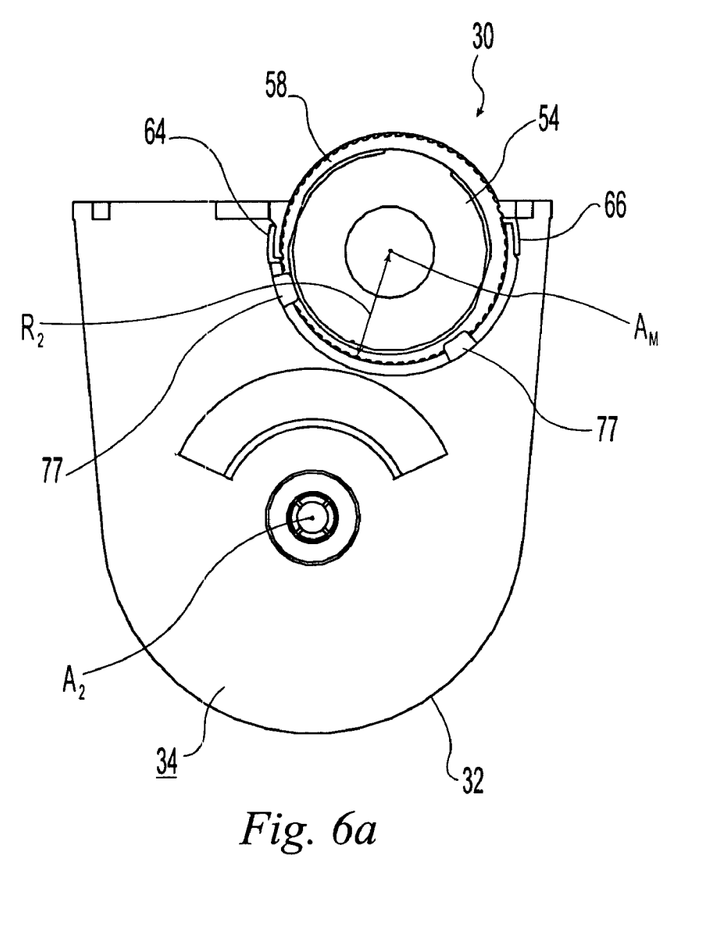
FIG. 6a is a bottom view of a tilt assembly according to another embodiment of the present invention wherein the motor assembly is in a first position.
Figure 6B:
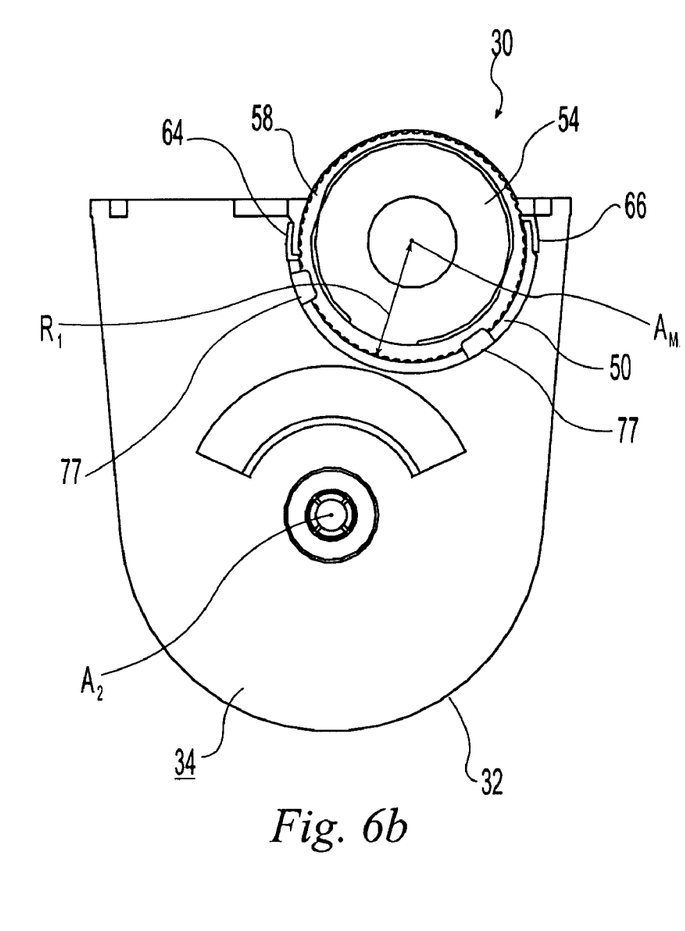
FIG. 6b is a bottom view of the tilt assembly of FIG. 6a wherein the motor assembly is in a second position.

As shown in FIGS. 4, 6a and 6b, a pair of cantilevered pawl mechanisms 64, 66 are fixed to support surface 52 and are configured to engage latching surface 72 of teeth 62. Pawl mechanisms 64, 66 are biased radially inward such that they bear against outer perimeter 60 of flange 58. In the illustrated example, the pawl mechanisms 64, 66 each include an attachment location (e.g., 64a) which unites the pawl mechanism with the remainder of plate 32 and about which the remainder of the pawl mechanism may flex. The pawl mechanisms 64, 66 have a length that freely extends from the integral hinge and which has a generally "L" shaped configuration. The longer section (eg., 64b) of the pawl mechanisms has a slightly arcuate shape to conform with sidewall 50 and the distal shorter section (e.g., 64c) of the extending "U" forms a latching portion that is engageable wit a latching surface 72 to prevent the rotation of flange 58 in one direction. The interaction of the L-shaped pawl mechanisms 64, 66 with teeth 62 of flange 58 allows for the one-way ratcheting rotation of flange 58 against sidewall 50 which allows pawl mechanisms 64, 66 to ride up and over the teeth when the flange is rotated so that the pawl mechanisms encounter camming surface 68, bearing surface 70 and latching surface 72 in that order but wherein the pawl mechanisms engage latching surface 72 to prevent rotation when flange 58 is rotated in the opposite direction.

Flexible member 46 exerts two main types of forces on motor 54. The first is due to the tension in member 46 and generates a force vector that is directed along the line extending between first axis $A_1$ and second axis first axis $A_2$. This force may be balanced by an equal and opposite bearing force transferred between flange 58 and sidewall 50. The other force exerted by flexible member 46 is a torque generated during operation of the motor. This force may be balanced by forces transferred between pawl mechanisms 64, 66 and latching surfaces 72 that are directed normal to a radial line extending from first axis $A_1$. In alternative embodiments, pawl mechanisms 64, 66 may also be placed so that the forces transferred between the pawl mechanisms and latching surfaces 72 are oriented substantially perpendicular to the forces transferred between flange 58 and sidewall 50 to minimize the possibility of inadvertently overloading the pawl mechanisms by tightening flexible member 46. Tabs 77 also restrain flange 58 and account for the axial separation between the two torque forces.

In operation, motor assembly 54 rotates motor shaft 55 about motor axis $A_m$, which in turn rotates first rotating member 41 about axis $A_1$. The rotation of first rotating member 41, through the engagement between gear portion 42 and gear portion 45 by flexible member 46, causes the rotation of second rotating member 44. The rotation of second rotating member 44 affects the tilting of camera 49 which is rotatably supported by tilt bearing 43. Tilting generally refers to the rotational movement of a camera about a horizontally disposed axis. In other words, when installed axis $A_2$ would have a horizontal orientation. The present invention, however, may also be used to provide panning movement of the camera wherein the rotational axis is vertically oriented, or, the rotational movement of the camera about an axis having an alternative orientation.

In order to achieve the smooth translation of rotational movement between first and second rotating members 41, 44, flexible member 46 should have the proper tension. Referring to FIGS. 6a and 6b, the tension of flexible member 46 is easily and selectively adjusted by rotating motor assembly 54. More particularly, motor assembly 54 is rotated about motor axis $A_1$ in a direction opposite the rotation of the motor shaft. As motor assembly 54 is rotated, bearing support surfaces 70 of flange 58 bear against support surface 52 of sidewall 50. Due to the radially variable distance between motor axis $A_m$ and bearing support surfaces 70, as flange 58 rotates within recess 48, motor axis $A_m$ is displaced relative to axis $A_2$ of second rotating member 44.

For instance, in FIG. 6a eccentric flange 58 is rotated to the position wherein the shortest radial distance $R_2$ lies along a line connecting motor axis $A_M$ with second axis $A_2$. In this position, first axis $A_1$ (and in the illustrated embodiment motor axis $A_M$) is located at its closest position relative to second axis $A_2$. In this position, flexible member 46 (FIG. 3) may be assembled around gear portions 42, 45 with minimal stress on flexible member 46 and first and second rotating members 42, 44. Once flexible member 46 is installed, the tension may be adjusted to the proper level by rotating motor assembly. For instance, motor assembly 54 may be rotated to the position shown in FIG. 6b, wherein a longer radial distance $R_2$ lies along a line connecting first axis $A_1$ with second axis $A_2$. In this position, first axis $A_1$ (and also motor axis $A_M$) is displaced to its furthest position relative to second axis $A_2$ and flexible member 46 is tensioned to its tightest level. Of course, motor assembly 54 need not be rotated to the point in FIG. 6b. Rather, motor assembly 54 may be rotated to any position at which flexible member 46 reaches its proper tension. Such position may vary depending on the exact dimensions of the tilt assembly components.

Referring to FIGS. 6a and 6b, flange 58 may be locked in position by either of pawls 64, 66, which engage latching surface 72 to prevent rotation of motor assembly 14 in the direction of the motor shaft. As flange 58 is rotated within recess 48, pawls 44, 46 slide up camming surface 68 deflecting away from motor axis $A_m$, slide across bearing surface 70, and snap into engagement with latching surface 72. As a result, teeth 62 provide a number of rotational positions in which flange 58 may be secured. In addition, teeth 62 and/or pawls 64, 66 may be in a staggered arrangement such that when one pawl 64 is in engagement with latching surface 72, the other pawl 66 bears against bearing surface 70, as shown in FIG. 6a. Further rotation of flange 58 results in pawl 64 bearing against bearing surface 70, and pawl 66 being in engagement with latch surface 72, as shown in FIG. 6b. Such a staggered arrangement increases the number of possible rotational positions in which flange 58 may be secured and allows for a finer adjustment of the tension in flexible member 46.

Referring hack to FIGS. 4 and 5, to facilitate the rotation of flange 58, motor housing 56 may define one or more engagement features. In the illustrated embodiment a collar 75 axially extending from flange 58 includes engagement features 74 that take the form of two substantially planar and parallel surfaces disposed on opposite sides of axis $A_M$ and which may be engaged by a wrench. In the illustrated embodiment collar 75 and engagement features 74 are integrally molded with motor housing 56, such that motor housing 56 and engagement features 74 are formed together as a single integral unit. Alternative forms of engagement features that can be engaged to affect the rotation of flange 58 may also be employed with the present invention.

To minimize the number of parts, the present invention contemplates that pawls 44, 46 may be integrally molded with mounting plate 32. In other words, mounting plate 32 may be molded to include recess 48, sidewall 50, support surface 52 and pawls 44, 46, such that mounting plate 32 is formed as a single unit including these features. Mounting plate 32 may be formed of any material permitting the necessary deflection of pawls 44, 46, such as a polymeric material. The illustrated embodiment, for example, may be molded using a polycarbonate material having between 10 and 20% glass fill, however, alternative materials and manufacturing methods may also be employed with the present invention. For example, pawls 44, 46 may be welded onto or machined into plate 32 or on motor housing 56 (with ratchet teeth being disposed on plate 32) and/or may be formed of a material, such as spring steel, different from that of the plate or housing and attached thereto. It should also be understood that, although the illustrated embodiments show a tilt assembly having two pawls, the present invention is also effective when having only a single pawl or more than two pawls.

While this invention has been described as having an exemplary design, the present invention may be further modified within the spirit and scope of this disclosure. This application is therefore intended to cover any variations, uses, or adaptations of the invention using its general principles.

What is claimed is:

1. A camera assembly comprising:
   a first rotating member and a second rotating member;
   a motor assembly operably coupled to said first rotating member and defining a first axis wherein said motor assembly drivingly rotates said first rotating member;
   a flexible member operably coupling said first and second rotating members, said second rotating member defining a second axis, rotation of said first rotating member causing rotation of said second rotating member through said flexible member;
   a camera operably coupled to said second rotating member, rotation of said second rotating member repositioning said camera;
   said motor assembly having a sidewall, said sidewall defining an annular support surface, said motor assembly further including a flange having a substantially circular outer circumference defining a plurality of teeth, each said teeth including a bearing surface and a latching surface, said at least one said bearing surface bearing against said support surface, said outer circumference defining a radially variable distance from said first axis defined by said first rotating member wherein rotation of said outer circumference relative to said annular support surface displaces said first axis relative to said second axis and thereby adjusts a tension force in said flexible member; and
   a first pawl mechanism fixed relative to said support surface and engageable with said outer circumference whereby engagement of said first pawl mechanism with one of said latching surfaces prevents relative rotational motion between said outer circumference and said annular support surface in a first rotational direction.

2. The camera assembly of claim 1 including a mounting plate, said mounting plate having a recess which defines said sidewall, said flange being disposed within said recess.

3. The camera assembly of claim 2 wherein said recess defines a substantially circular opening.

4. The camera assembly of claim 2 wherein said mounting plate is made of a polymeric material and said at least one pawl mechanism is integrally formed with said mounting plate.

5. The camera assembly of claim 1 including a second pawl mechanism fixed relative to said support surface, said second pawl mechanism engageable with a said latching surface and thereby preventing relative rotational motion between said outer circumference and said support surface in said first rotational direction, only one of said first and second pawl mechanisms engaging a latching surface at a time.

6. The camera assembly of claim 1 wherein each said teeth further include a camming surface disposed between said bearing surface and said latching surface, said camming surface adapted to radially bias said pawl mechanism as said flange is rotated relative to said support surface when said pawl mechanism is engaged with said camming surface.

7. The camera assembly of claim 1 wherein said plurality of bearing surfaces define a plurality of different circumferential lengths.

8. The camera assembly of claim 1 wherein said bearing surfaces are disposed at variable radial distances from said first axis.

9. The camera assembly of claim 1 wherein the tension in said flexible member is substantially balanced by a force transferred between said bearing surfaces and said support surface.

10. The camera assembly of claim 1 wherein a torque generated by operation of said motor and rotation of said first rotating member is substantially balanced by a force transferred between said at least one pawl mechanism and a respective latching surface.

11. The camera assembly of claim 1 wherein said flexible member engages said second rotating member to define a radius that is greater than a radius defined by the engagement of said flexible member and said first rotating member.

12. The camera assembly of claim 1 wherein said motor assembly includes a motor shaft defining said first axis and said first rotating member comprises a gear member mounted on said motor shaft.

13. The camera assembly of claim 1 further comprising a mounting plate, said mounting plate and said sidewall defining a recess, said flange being disposed within said recess, said second rotating member being rotatably mounted on said mounting plate.

14. The camera assembly of claim 1 wherein said motor assembly includes an engagement feature whereby said motor assembly may be rotated relative to said support surface to thereby adjust the tension in said flexible member.

15. The camera assembly of claim 14 wherein said engagement feature comprises two substantially planar, spaced apart, surfaces disposed on opposite sides of said first axis.

16. A method of tensioning a flexible member for repositioning a camera; said method comprising:
    providing a camera;
    providing a motor;
    operably coupling the motor and the camera with a belt drive assembly, the belt drive assembly including a flexible member operably coupling a first rotatable member and a second rotatable member, said first rotatable member defining a first axis and said second rotatable member defining a second axis; and
    tensioning the flexible member by adjusting the position of said first axis relative to said second axis and securing the first rotatable member in a desired position by engaging a toothed surface with a pawl mechanism, said toothed surface comprising a plurality of teeth, each tooth including a bearing surface and a latching surface, one of said toothed surfaces and said pawl mechanism being fixed relative to said first axis.

17. The method of claim 16 wherein said motor has a housing including a flange defining the toothed surface, said method further comprising the step of positioning the flange in a recess defined by a mounting plate and wherein said step of tensioning the flexible member includes rotating the flange within the recess.